United States Patent [19]
Teramoto et al.

[11] Patent Number: 5,520,809
[45] Date of Patent: May 28, 1996

[54] SEPARATION MEMBRANES

[75] Inventors: Takero Teramoto; Kazuhiro Sugiyama; Masaya Furukawa; Hironobu Kawasato; Tutomu Kaneta; Kazuhiro Watanabe, all of Kawasaki, Japan

[73] Assignee: Nippon Steel Corporation, Tokyo, Japan

[21] Appl. No.: 97,052

[22] Filed: Jul. 27, 1993

[30] Foreign Application Priority Data

Jul. 27, 1992 [JP] Japan ................................. 4-218755

[51] Int. Cl.$^6$ ................................................. B01D 71/56
[52] U.S. Cl. ............................. 210/500.39; 210/500.4; 210/500.23
[58] Field of Search ...................... 210/490, 500.4, 210/500.27, 500.28, 500.38, 500.39, 500.23; 96/10, 14; 95/45

[56] References Cited

U.S. PATENT DOCUMENTS

| | | | |
|---|---|---|---|
| 5,085,676 | 2/1992 | Ekiner et al. | 210/500.23 X |
| 5,116,504 | 5/1992 | Sakashita et al. | 210/500.23 |
| 5,352,272 | 10/1994 | Moll et al. | 96/9 |

FOREIGN PATENT DOCUMENTS 61-35803  2/1986  Japan.

*Primary Examiner*—Frank Spear
*Attorney, Agent, or Firm*—Birch, Stewart, Kolasch & Birch

[57] ABSTRACT

This invention relates to separation membranes composed of a mixture of two kinds or more of polymers containing at least one kind of polymer selected from polyesters, polyethers, polycarbonates, polyamides, and polyimides with a fluorene skeleton and possessing a spongy structure throughout and the membranes can be made by a known simple process, have not only excellent separatory ability but also good mechanical properties, and are particularly useful for ultrafiltration membranes and gas separation membranes.

10 Claims, 1 Drawing Sheet

SEPARATION MEMBRANES

FIELD OF THE INVENTION AND RELATED ART STATEMENT

This invention relates to separation membranes with good mechanical strength, and more particularly, to separation membranes applicable to selective separation of oxygen or nitrogen from air and to ultrafiltration for the concentration of liquid foods and for the concentration, separation, and purification in the manufacturing processes of pharmaceuticals.

The separation technologies with the use of organic polymers as materials for separation membranes have recently made remarkable advances and some of them have been put to practical use on a commercial scale. For example, precision filtration membranes or ultrafiltration membranes are used in treatment of industrial wastewater, treatment of wastewater in commercial buildings for reuse as toilet flush, concentration of liquid foods, and manufacture of pharmaceuticals. In particular, the separation membrane modules for use in the manufacturing processes for pharmaceuticals and in the concentration of liquid foods need to be kept clean and there is a demand for separation membranes with sufficient mechanical strength to withstand high-pressure steam sterilization which is very quick and simple to apply and safe to the human body.

As for membranes for gas separation, that is, membranes for the enrichment of a specified gas from a mixture of gases, the utilization of nitrogen-enriched air with a nitrogen concentration of 95 to 99% is drawing public attention particularly in recent years.

A practice employed to obtain such nitrogen-enriched air with the use of a membrane separation technique is to apply a membrane for selective permeation of oxygen to let a higher proportion of oxygen in the feed air permeate through the membrane and make use of the nonpermeating gas with a reduced oxygen concentration.

It is necessary to have separation membranes with high oxygen selectivity on hand in order to obtain nitrogen-enriched air of a specified nitrogen concentration efficiently with minimized consumption of energy. Also, the production of a large volume of nitrogen-enriched air requires membranes of high oxygen selectivity and, at the same time, membranes of small thickness and a means to supply air at high pressure. For this reason, there is a necessity for separation membranes possessing not only capability of separating oxygen and nitrogen but also high mechanical strength.

It is, however, not possible to obtain sufficient mechanical strength from the conventional membrane-forming materials with the use of simple and inexpensive membrane-manufacturing techniques in the public knowledge. For example, in the flat membranes, tubular membranes, and hollow-fiber membranes for ultrafiltration or gas separation manufactured by known wet processes from those raw materials which have been reported for organic polymer membranes, the formation of a skin with separatory function on the surface of the membrane causes the formation of the so-called "finger structure" inside the membrane during the manufacturing step and high mechanical strength is not obtained.

In consequence, attempts have been made to prepare composite membranes and processes have been reported for the formation of thin membranes of resins with a separatory capability on membranes of a completely spongy structure with high strength. For example, the manufacture of a composite membrane having a thin active layer for gas separation on a porous support is attempted in Kokai Tokkyo Koho No. Sho 61-35,803 (1986). Composite membranes of this kind, however, show low oxygen nitrogen selectivity and, besides, the manufacturing processes disclosed therein for forming composite membranes are expensive. In short, the manufacturing processes for nitrogen-enriched air with the use of membranes have not been adopted widely at the present time. The spongy structure mentioned above refers to a network of interconnected micro cells or an aggregate of fine particles with an average diameter of 0.01 to 10 μm forming interconnected cells, the interconnected cells possessing a pore diameter of 10 μm or less.

OBJECT AND SUMMARY OF THE INVENTION

The present inventors have conducted extensive studies to find useful separation membranes, particularly those with high mechanical strength, found that a mixture of polymers containing at least one kind of polymers containing a fluorene skeleton selected from polyesters, polyethers, polycarbonates, polyamides, and polyimides is formed by a known simple method into a membrane having a substantially spongy structure throughout and free of the finger structure, and completed this invention.

Accordingly, it is an object of this invention to provide separation membranes which show excellent mechanical strength and heat resistance without lowering their separatory function.

This invention thus relates to separation membranes being composed of a mixture of two or more kinds of polymers containing at least one kind of polymers selected from polyesters, polyethers, polycarbonates, polyamides, and polyimides represented by the following general formulas (1) to (5)

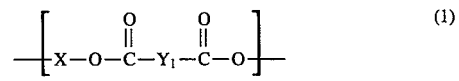

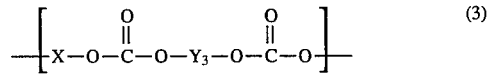

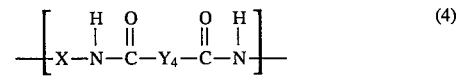

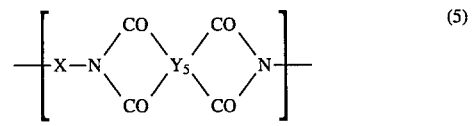

[$Y_1$, $Y_2$, $Y_3$, and $Y_4$ designate divalent organic groups, $Y_5$ designates a tetravalent organic group, and X is a divalent organic group containing at least partly a group represented by the following structure (A)

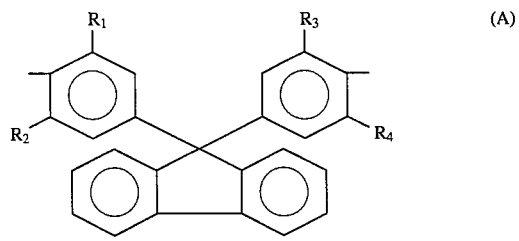

wherein $R_1$ to $R_4$ are any one of H, alkyl groups with 1 to 4 carbon atoms, alkoxy groups, and halogens, and possessing a substantially spongy structure throughout.

The polyesters of the general formula (1) to be used in this invention are obtained by the reaction of diols with dicarboxylic acids and the dicarboxylic acids to serve as raw materials for the $Y_1$ component in the general formula (1) include aromatic dicarboxylic acids and aliphatic dicarboxylic acids. Phthalic acid and/or isophthalic acid are cited for the aromatic dicarboxylic acids while succinic acid, glutaric acid, adipic acid, pimelic acid, and suberic acid are cited for the aliphatic dicarboxylic acids $HOOC(CH_2)_mCOOH$ (m=2–6), with adipic acid being most preferred. A single kind of the aromatic and aliphatic dicarboxylic acids mentioned above may be used or a mixture of two kinds or more may be used without ill effect.

The polyethers of the general formula (2) to be used in this invention are obtained by the reaction of diols with halogenated dichlorodiphenyl sulfones and the raw materials for the $Y_2$ component in the general formula (2) are compounds represented by the following structures (B) and (C)

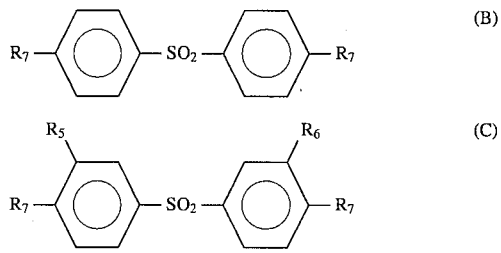

wherein $R_5$ and $R_6$ are H or electron-attracting groups and at least one of the two is an electron-attracting group and $R_7$ is a halogen. The electron-attracting groups here are preferably halogens such as F, Cl, and Br or $NO_2$, and $R_7$ may be any one of F, Cl, and Br. These compounds (B) and (C) may be used singly or as a mixture of two or more. Plural compounds having different electron-attracting groups may be used for the compound (C).

Specific examples of the compounds having the structures (B) and (C) are halogenated diphenyl sulfones such as 4,4'-dichlorodiphenyl sulfone, 3,3',4,4'-tetrachlorodiphenyl sulfone, and 4,4'-dichloro-3,3'-dinitrodiphenyl sulfone.

The polycarbonates of the general formula (3) to be used in this invention are obtained by the reaction of diols with phosgene dimer and the phosgene dimer to serve as raw material for the $Y_3$ component in the general formula (3) is trichloromethyl chloroformate.

In any of the above-mentioned general formulas (1) to (3), the raw materials for the X component are diols containing the fluorene skeleton alone or a mixture of diols containing the fluorene skeleton and other diols. Bisphenolfluorenes are used as raw material diols containing the fluorene skeleton for the X component and their examples include 9,9-bis(4-hydroxyphenyl)fluorene, 9,9-bis(3,5-dimethyl-4-hydroxyphenyl) fluorene, 9,9-bis(3-methyl-4-hydroxyphenyl)fluorene, 9,9-bis(5-methyl-4-hydroxyphenyl)fluorene, 9,9-bis(3,5-diethyl-4-hydroxyphenyl)fluorene, 9,9-bis(3-ethyl-4-hydroxyphenyl)fluorene, and 9,9-bis(5-ethyl-4-hydroxyphenyl)fluorene. These bisphenolfluorenes can be prepared readily from fluorenes contained in coal tar and phenols. The other diols include aromatic group-containing bisphenol A, bisphenol S, naphthalenediols, and xylenols and aliphatic group-containing diethylene glycol and butanediol. Their salts with an alkali metal such as sodium and potassium can also be used.

In the cases where a mixture of diols containing the fluorene skeleton and other diols is used as raw material for the X component, the mol ratio of the diols containing the fluorene skeleton to the other diols is preferably 99/1 to 10/90 in any of the general formulas (1) to (3). A mol ratio of less than 10/90 cannot yield good solvent solubility.

The polyamides of the general formula (4) to be used in this invention are obtained by the reaction of diamines with dicarboxylic acid dichlorides and the dicarboxylic acid dichlorides to serve as raw materials for the $Y_4$ component in the general formula (4) include aromatic dicarboxylic acid dichlorides and aliphatic dicarboxylic acid dichlorides. Phthaloyl chloride and/or isophthaloyl chloride are cited for the aromatic dicarboxylic acid dichlorides and succinoyl chloride, glutaryl chloride, adipoyl chloride, pimeloyl chloride, and suberoyl chloride are cited for the aliphatic dicarboxylic acid dichlorides $ClOC(CH_2)_mCOCl$ (m=2–6), with adipoyl chloride being most suited. A single kind of these aromatic and aliphatic dicarboxylic acid dichlorides may be used or a mixture of two kinds or more may be used without ill effect.

The polyimides of the general formula (5) to be used in this invention are obtained by the reaction of diamines and tetracarboxylic acid dianhydrides and the tetracarboxylic acid dianhydrides to serve as raw materials for the $Y_5$ component in the general formula (5) mean tetracarboxylic acid dianhydrides containing two sets of neighboring carboxylic groups in the molecule and their specific examples include pyromellitic acid dianhydride, 3,3',4,4'-benzophenonetetracarboxylic acid dianhydride, bis(2,3-dicarboxyphenyl) sulfone dianhydride, and 2,2-bis(3,4-biscarboxyphenyl)-1,1,1,3,3,3-hexafluoropropane dianhydride. A single kind of these tetracarboxylic acids may be used or a mixture of two kinds of more may be used without ill effect.

As raw materials for the X component in the aforesaid general formulas (4) and (5), diamines containing the fluorene skeleton alone or a mixture of diamines containing the fluorene skeleton and other diamines can be used. Bisanilinefluorenes are used as raw material diamines containing the fluorene skeleton for the X component in the general formulas (4) and (5) and they include 9,9-bis(4-aminophenyl) fluorene, 9,9-bis(3,5-dimethyl-4-aminophenyl)fluorene, 9,9-bis(3-methyl-4-aminophenyl)fluorene, 9,9-bis(5-methyl-4-aminophenyl)fluorene, 9,9bis(3,5-diethyl-4-aminophenyl)fluorene, 9,9-bis(3-ethyl-4-aminophenyl)fluorene, and 9,9-bis(5-ethyl-4-aminophenyl)fluorene. These bisanilinefluorenes can be prepared readily from fluorenes contained in coal tar and anilines. The other diamines include aromatic group-containing 2,7-diaminofluorene, naphthalenediamines, and 2,8-diaminobenzofuran and aliphatic group-containing hexamethylenediamine and isopropyldiamine.

In the cases where a mixture of diamines containing the fluorene skeleton and other diamines is used as raw material for the X component in the general formulas (4) and (5), the mol ratio of the diamines containing the fluorene skeleton to the other diamines is preferably 99/1 to 10/90. A mol ratio smaller than 10/90 cannot yield good solvent solubility.

Any of the polyesters, polyethers, polycarbonates, polyamides, and polyimides represented by the aforesaid general formulas (1) to (5) is readily soluble in dimethylacetamide, N-methylpyrrolidone, or cresol. The separation membranes of this invention are separation membranes of a spongy structure made by a wet process using a mixture of polymers containing at least one kind of the above-mentioned polymers as membrane-forming material.

The other polymers to be used as mixed with the aforesaid polymers containing the fluorene skeleton are not specified as long as they are soluble in amide-based solvents and their examples include polysulfones, polyesters, polyamides, polyimides, and polyamideimides. In the preparation of a mixture of the polymers containing the fluorene skeleton with the other polymers, the ratio by weight of the two is preferably in the range from 99/1 to 50/50.

Any known membrane-making process is applicable here. For example, a stock solution is prepared by dissolving the aforesaid mixture of polymides and polyamides in a suitable organic solvent containing, as needed, lithium chloride and the like, cast or applied to a flat glass plate, left for a specified length of time to allow the solvent to evaporate in part, and immersed in a nonsolvent miscible with the solvent in the solution to remove the solvent and form a flat membrane.

It is also possible to produce hollow-fiber membranes by simultaneously extruding the aforesaid stock solution through the ring-shaped opening and a nonsolvent miscible with the solvent in the stock solution through the round opening of a hollow-fiber spinning nozzle of a double-tube structure into a coagulating bath.

A wet process such as above forms membranes which have a skin on both sides or at least on one side and said skin continues into a spongy structure. The separation membranes thus prepared can be used for ultrafiltration membranes in a wet condition and the wet membranes can be dried and used advantageously as gas separation membranes. The drying can be done in the usual manner and, for example, the membranes are dried in air at room temperature and then dried in vacuum or heated at 100° C. or so.

The spongy structure here refers to a network of interconnected micro cells or an aggregate of fine particles with an average diameter of 0.01 to 10 μm forming interconnected cells, the interconnected cells possessing a pore diameter of 10 μm or less.

The separation membranes of this invention are characterized by the absence of the so-called "finger structure" which is a void often of relatively large extension and this is the reason why they have excellent mechanical strength. The existence of the spongy structure can be confirmed readily in the membranes of this invention with the aid of a scanning electron microscope.

The separation membranes of this invention not only fulfil their separatory function well but also possess good mechanical strength; hence there is no particular need for them to be made into composites and they are best suited for ultrafiltration membranes and gas separation membranes.

DETAILED DESCRIPTION OF THE PREFERRED EMBODIMENTS

This invention will be described in detail with reference to the accompanying examples and comparative examples, although certainly not limited thereto.

As for the performance of ultrafiltration membranes, the rate of permeation of pure water and the cutoff molecular weight were determined in the following examples and comparative examples. The rate of permeation of pure water was determined under the conditions where the operating pressure was 1.0 kg/cm$^2$, the flow rate was 1.5 cm/second, and the temperature was 25° C. As for the cutoff molecular weight, the degree of rejection of monodisperse dextran with an average molecular weight of 70,000, 40,000, or 10,000 was determined under the foregoing conditions and the molecular weight of dextran at 50% rejection was taken as the cutoff molecular weight at the test temperature.

As for the performance of gas separation, artificial air with the oxygen concentration of 21% and the nitrogen concentration of 79% was used, the gas pressure was set at 2 atmospheres on the primary side and at atmospheric on the secondary side, the permeation rates of the gases through the membrane were determined on the secondary side and also the concentrations of oxygen and nitrogen were determined with the aid of a gas chromatograph and, from these values, the rate of oxygen permeation and the oxygen nitrogen selectivity were determined.

Example 1

A stock solution for the manufacture of membranes was prepared by dissolving 8 parts by weight of polyester synthesized from 35.0 g. of 9,9-bis(4-hydroxyphenyl)fluorene, 3.04 g. of fumaroyl chloride, and 16.24 g. of tcrephthaloyl chloride, 8 parts by weight of polyether synthesized from 28.0 g. of 9,9-bis(4-hydroxyphenyl)fluorene and 23.0 g. of 4,4'-dichlorodiphenyl sulfone, and 5 parts by weight of lithium chloride in 100 parts by weight of purified N,N-dimethylacetamide, the stock solution was formed into a wet hollow-fiber membrane by a known process for the manufacture of hollow-fiber membranes; namely, the stock solution and pure water were extruded continuously from the ring-shaped opening and the round opening of a double-tube nozzle respectively and the extrudate was allowed to travel through air and then immersed in a coagulating water bath. The hollow-fiber membrane thus obtained was dried in air at room temperature and then dried thoroughly at 100° C. to furnish a dry hollow-fiber membrane with an outer diameter of 0.3 mm.

A minimodule was constructed from the dry hollow-fiber and submitted to the determination of the rate of permeation of oxygen and the oxygen-nitrogen selectivity and also to a tensile test. The results are shown in Table 1.

Figure 1:
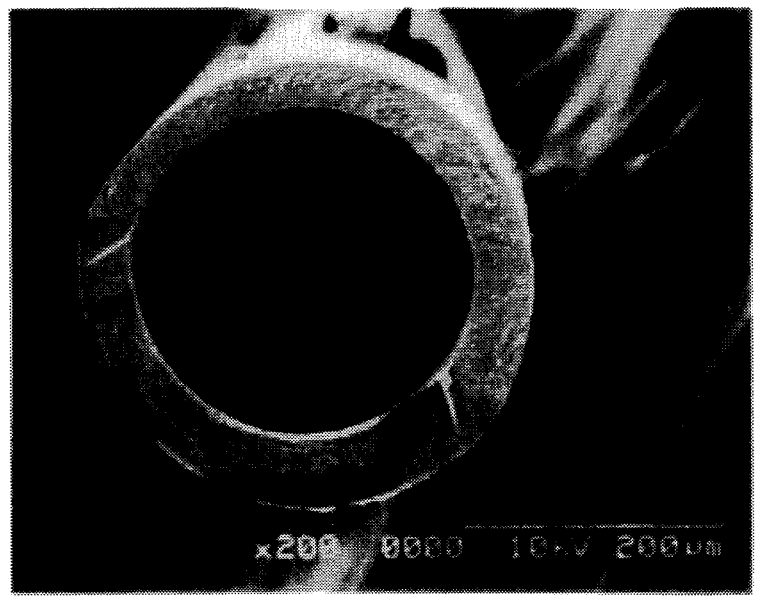
FIG. 1 is a scanning electron micrograph showing the configuration of the cross section of the dry hollow-fiber membrane obtained in Example 1 of this invention.

The cross section of the dry hollow-fiber membrane was observed by a scanning electron microscope and also photographed. This membrane had a spongy structure throughout and the presence of the finger structure was not observed. The result is shown in FIG. 1.

Example 2

A stock solution for the manufacture of membranes was prepared by dissolving 8 parts by weight of polyamide synthesized from 27.8 g. of 9,9-bis(4-aminophenyl)fluorene and 16.24 g. of terephthaloyl chloride, 8 parts by weight of polyimide synthesized from 5.383 g. of 9,9-bis(4-aminophenyl)fluorene, 3.797 g. of 1,5-naphthalenediamine, and 17.770 g. of 2,2-bis(3,4-biscarboxyphenyl)-1,1,1,3,3,3-hexafluoropropane dianhydride, and 5 parts by weight of lithium chloride in 100 parts by weight of purified N,N-dimethylacetamide and the stock solution was formed into a dry hollow-fiber membrane in the same manner as in Example 1.

The dry hollow-fiber membrane was submitted to the determination of the rate of permeation of oxygen and the oxygen-nitrogen selectivity and also to the tensile test as in Example 1. The results are shown in Table 1.

Example 3

A stock solution for the manufacture of membranes was prepared by dissolving 8 parts by weight of polycarbonate synthesized from 35 g. of 9,9-bis(4-hydroxyphenyl)fluorene and 12 ml. of phosgene diver (trichloromethyl chloroformate.), 8 parts by weight of the same polyamide as in Example 2, and 5 parts by weight of lithium chloride in 100 parts by weight of purified N,N-dimethylacetamide and the stock solution was formed into a dry hollow-fiber membrane in the same manner as in Example 1.

The dry hollow-fiber membrane was submitted to the determination of the rate of permeation of oxygen and the oxygen nitrogen selectivity and also to the tensile test as in Example 1. The results are shown in Table 1.

Example 4

A stock solution for the manufacture of membranes was prepared by dissolving 4 parts by weight of polyimide synthesized from 34.8 g. of 9,9-bis(4-aminophenyl)fluorene, 13.09 g. of pyromellitic dianhydride, and 11.77 g. of biphenyltetracarboxylic acid dianhydride and 16 parts by weight of the polyamide of Example 2 in 100 parts by weight of purified N,N-dimethylacetamide and the stock solution was formed into a dry hollow-fiber membrane in the same manner as in Example 1.

The dry hollow-fiber membrane was submitted to the determination of the rate of permeation of oxygen and the oxygen-nitrogen selectivity and also to the tensile test as in Example 1. The results are shown in Table 1.

The cross section of the dry hollow-fiber membrane was observed by a scanning electron microscope and also photographed as in Example 1. This membrane had a spongy structure throughout and the presence of the finger structure was not observed.

Example 5

A stock solution for the manufacture of membranes was prepared by dissolving 16 parts by weight of the same polyimide as in Example 4 and 4 parts by weight of the polyamide of Example 2 in 100 parts by weight of purified N,N-dimethylacetamide and the stock solution was formed into a dry hollow-fiber membrane in the same manner as in Example 1. The dry hollow-fiber membrane was submitted to the determination of the rate of permeation of oxygen and the oxygen-nitrogen selectivity and also to the tensile test as in Example 1. The results are shown in Table 1.

Observation of the cross section of the dry hollow-fiber membrane by a scanning electron microscope as in Example 1 indicated that the membrane had a substantially spongy structure throughout and the finger structure was not present.

Example 6

A stock solution for the manufacture of membranes was prepared by dissolving 5 parts by weight of lithium chloride, 8 parts by weight of the same polyimide as in Example 4, 8 parts by weight of the polyether of Example 1, and 2 parts by weight of commercial polysulfone (Udel P 1700, made by UCC) in 100 parts by weight of purified N,N-dimethylacetamide and the stock solution was formed into a dry hollow-fiber membrane in the same manner as in Example 1.

The dry hollow-fiber membrane was submitted to the determination of the rate of permeation of oxygen and the oxygen-nitrogen selectivity and also to the tensile test as in Example 1. The results are shown in Table 1.

Observation of the cross section of the dry hollow-fiber membrane by a scanning electron microscope as in Example 1 indicated that the membrane had a spongy structure throughout and the finger structure was not present.

TABLE 1

| Example No. | Oxygen permeation rate (*1) | Oxygen nitrogen selectivity | Tensile strength kgf/cm$^2$ | Elongation % |
| --- | --- | --- | --- | --- |
| 1 | 2.3 | 4.2 | 2.4 | 18 |
| 2 | 6.8 | 3.9 | 2.1 | 21 |
| 3 | 2.1 | 3.8 | 2.2 | 17 |

TABLE 1-continued

| Example No. | Oxygen permeation rate (*1) | Oxygen nitrogen selectivity | Tensile strength kgf/cm$^2$ | Elongation % |
| --- | --- | --- | --- | --- |
| 4 | 1.1 | 4.8 | 2.8 | 22 |
| 5 | 2.1 | 4.2 | 2.4 | 19 |
| 6 | 1.5 | 3.8 | 1.9 | 16 |

(Note)
(*1): × 10$^{-5}$ Ncm$^2$/cm · sec · cmHg

Example 7

A stock solution for the manufacture of membranes was prepared by dissolving 5 parts by weight of lithium chloride, 8 parts by weight of the same polyester as in Example 1, and 8 parts by weight of the same polyether as in Example 1 in 100 parts by weight of purified N,N-dimethylacetamide and the stock solution was formed into a wet hollow-fiber membrane with an outer diameter of 0.7 mm in the same manner as in Example 1.

The wet hollow-fiber membrane was submitted to the determination of the rate of permeation of pure water, the cutoff molecular weight, and the burst strength at the test temperature. The burst strength is expressed by the pressure at which the hollow fiber bursts when one end is sealed and pure water was introduced under pressure. The results are shown in Table 2.

Furthermore, the above-mentioned wet hollow-fiber membrane was thoroughly dried and its cross section was observed by a scanning electron microscope. The membrane had a spongy structure throughout as in FIG. 1 and the existence of the finger structure was not noticed.

Example 8

A stock solution for the manufacture of membranes was prepared by dissolving 5 parts by weight of lithium chloride, 8 parts by weight of the same polycarbonate as in Example 3, and 8 parts by weight of the same polyamide as in Example 2 in 100 parts by weight of purified N,N-dimethylacetamide and the stock solution was formed into a wet hollow-fiber membrane as in Example 7.

The wet hollow-fiber membrane thus obtained was submitted to the determination of the rate of permeation of pure water, the cutoff molecular weight, and the burst strength at the test temperature. The results are shown in Table 2.

Example 9

A stock solution for the manufacture of membranes was prepared by dissolving 5 parts by weight of lithium chloride, 8 parts by weight of the same polyamide as in Example 2, and 8 parts by weight of the same polyimide as in Example 4 in 100 parts by weight of purified N,N-dimethylacetamide and the stock solution was formed into a wet hollow-fiber membrane as in Example 7.

The wet hollow-fiber membrane thus obtained was submitted to the determination of the rate of permeation of pure water, the cutoff molecular weight, and the burst strength at the test temperature. The results are shown in Table 2.

The cross section of this wet hollow-fiber membrane was confirmed to have a spongy structure throughout as in Example 1.

TABLE 2

| Example No. | Temperature °C. | Permeation rate of pure water (*2) | Cutoff molecular weight | Burst strength kg/cm$^2$ |
| --- | --- | --- | --- | --- |
| 7 | 25 | 50 | 7,000 | 22 |

TABLE 2-continued

| Example No. | Temperature °C. | Permeation rate of pure water (*2) | Cutoff molecular weight | Burst strength kg/cm² |
| --- | --- | --- | --- | --- |
| 8 | 25 | 80 | 20,000 | 21 |
| 9 | 25 | 100 | 35,000 | 25 |

(Note)
(*2): $1/m^2 \cdot hr \cdot (kg/cm^2)$

Example 10

A pressure test was repeated continuously 10,000 times with one cycle consisting of supplying a test gas to the minimodule constructed in the aforesaid Example 5 from a dry hollow-fiber membrane, keeping the pressure of the gas at 10 kg/cm² for 1 second, then reducing the pressure at a stroke to atmospheric, and leaving there for 1 second. Thereafter, the rate of permeation of oxygen and the oxygen nitrogen selectivity were determined again in the same manner as in Example 1. The results indicated that the rate of permeation of oxygen was $2.0 \times 10^{-5}$ (Ncm³/cm².sec.cmHg) and the oxygen nitrogen selectivity was 4.2 (−) with no significant change from the level before the pressure test.

Comparative Example 1

A stock solution for the manufacture of membranes was prepared as in Example 1 by dissolving 16 parts by weight of the same polyester as in Example 1 and the solution was formed into a dry hollow-fiber membrane with an outer diameter of 0.3 mm.

The dry hollow-fiber membrane thus obtained was submitted to the determination of the rate of permeation of oxygen and the oxygen-nitrogen selectivity and also to the tensile test. The results are shown in Table 3.

Figure 2:
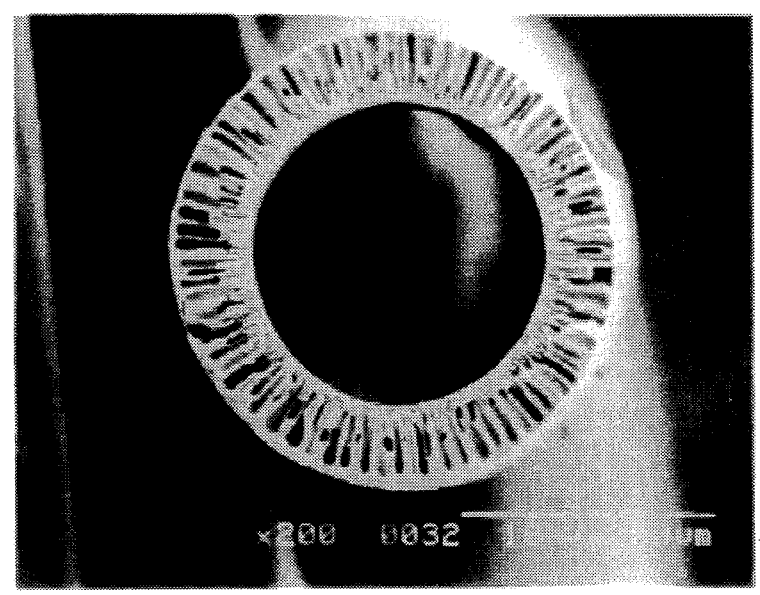
FIG. 2 is a scanning electron micrograph showing the configuration of the cross section of the dry hollow-fiber membrane obtained in Comparative Example 1.

The cross section of the dry hollow-fiber was observed by a scanning electron microscope and photographed. The membrane has a small portion of the spongy structure and a large portion of the finger structure. The result is shown in FIG. 2.

Comparative Example 2

A stock solution for the manufacture of membranes was prepared as in Example 1 by dissolving 16 parts by weight of the same polyamide as in Example 2 and the solution was formed into a dry hollow-fiber membrane in the same manner as in Example 4.

The dry hollow-fiber membrane thus obtained was submitted to the determination of the rate of permeation of oxygen and the oxygen-nitrogen selectivity and also to the tensile test. The results are shown in Table 3.

The dry hollow-fiber was confirmed to have a small portion of the spongy structure and a large portion of the finger structure.

Comparative Example 3

A stock solution for the manufacture of membranes was prepared as in Example 1 by dissolving 16 parts by weight of the same polyimide as in Example 4 and the solution was formed into a dry hollow-fiber membrane in the same manner as in Example 4.

The dry hollow-fiber membrane thus obtained was submitted to the determination of the rate of permeation of oxygen and the oxygen-nitrogen selectivity and also to the tensile test. The results are shown in Table 3.

The dry hollow-fiber was confirmed to have a small portion of the spongy structure and a large portion of the finger structure.

TABLE 3

| Comparative example No. | Oxygen permeation rate (*1) | Oxygen nitrogen selectivity | Tensile strength kgf/cm² | Elongation % |
| --- | --- | --- | --- | --- |
| 1 | 2.3 | 4.6 | 0.84 | 1.6 |
| 2 | 2.1 | 4.8 | 0.76 | 2.1 |
| 3 | 4.5 | 4.3 | 0.65 | 1.4 |

(Note)
(*1): $\times 10^{-5}$ Ncm²/cm · sec · cmHg

Comparative Example 4

A stock solution for the manufacture of membranes was prepared by dissolving 5 parts by weight of lithium chloride and 16 parts by weight of the same polyester as in Example 1 in 100 parts by weight of purified N,N-dimethylacetamide and the solution was formed into a wet hollow-fiber membrane with an outer diameter of 0.7 mm in the same manner as in Example 1.

The wet hollow-fiber membrane was submitted to the determination of the rate of permeation of pure water and the cutoff molecular weight and also of the burst strength at the test temperature. The results are shown in Table 4.

Observation of the cross-sectional structure of the hollow-fiber membrane as in Example 1 confirmed that the membrane has a small portion of the spongy structure and a large portion of the finger structure.

Comparative Example 5

A stock solution for the manufacture of membranes was prepared as in Comparative Example 1 by dissolving 16 parts by weight of the same polyamide as in Example 2 and the solution was formed into a wet hollow-fiber membrane in the same manner as in Example 1.

The wet hollow-fiber membrane was submitted to the determination of the rate of permeation of pure water, the cutoff molecular weight, and the burst strength at the test temperature. The results are shown in Table 4.

The hollow fiber was confirmed to have a small portion of the spongy structure and a large portion of the finger structure.

Comparative Example 6

A stock solution for the manufacture of membranes was prepared as in Comparative Example 1 by dissolving 16 parts by weight of the same polyether as in Example 1 and the solution was formed into a wet hollow-fiber membrane in the same manner as in Example 1.

The wet hollow-fiber membrane was submitted to the determination of the rate of permeation of pure water, the cutoff molecular weight, and the burst strength at the test temperature. The results are shown in Table 4.

The hollow fiber was confirmed to have a small portion of the spongy structure and a large portion of the finger structure.

Comparative Example 7

A stock solution for the manufacture of membranes was prepared as in Comparative Example 1 by dissolving 16 parts by weight of the same polyimide as in Example 3 and the solution was formed into a wet hollow-fiber membrane in the same manner as in Example 1.

The wet hollow-fiber membrane was submitted to the determination of the rate of permeation of pure water, the cutoff molecular weight, and the burst strength at the test temperature. The results are shown in Table 4.

The hollow fiber was confirmed to have a small portion of the spongy structure and a large portion of the finger structure.

TABLE 4

| Comparative example No. | Temperature °C. | Permeation rate of pure water (*2) | Cutoff molecular weight | Burst strength kg/cm² |
|---|---|---|---|---|
| 4 | 25 | 40 | 6,000 | 11 |
| 5 | 25 | 70 | 25,000 | 13 |
| 6 | 25 | 60 | 22,000 | 14 |
| 7 | 25 | 110 | 31,000 | 8 |

(Note)
(*2): $1/m^2 \cdot hr \cdot (kg/cm^2)$

Comparative Example 8

The pressure test was repeated as in Example 9 with the use of the minimodule constructed in the aforesaid Comparative Example 3 from a dry hollow-fiber membrane. The results confirmed that the hollow-fiber membrane suffered damages after the 100th cycle.

What is claimed is:

1. Separation membranes comprising a mixture of polymers containing at least two different types of polymers selected from the group consisting of polyesters, polyethers, polycarbonates, polyamides, and polyimides respectively represented by the following general formulas (1) to (5)

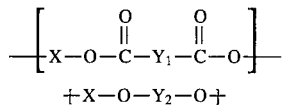 (1)

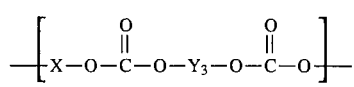 (2)

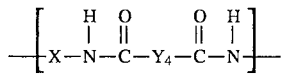 (3)

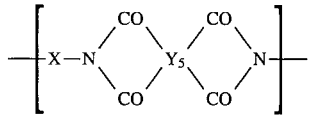 (4)

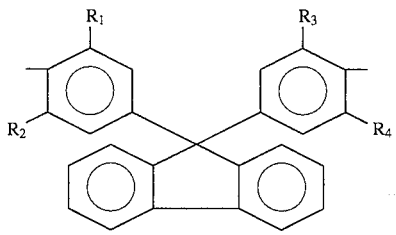 (5)

wherein $Y_1$, $Y_2$, $Y_3$ and $Y_4$ designate divalent organic groups, $Y_5$ designates a tetravalent organic group, and X is a divalent organic group containing at least partly a group represented by the following structural formula (A):

(A)

wherein $R_1$ to $R_4$ designate any one of H, alkyl groups with 1 to 4 carbon atoms, alkoxy groups, and halogens, and possessing a substantially spongy structure throughout.

2. Separation membranes according to claim 1 wherein the divalent organic group X is a divalent organic group containing the fluorene skeleton represented by the structural formula (A) in all of the polymers represented by the general formulas (1) to (5).

3. Separation membranes according to claim 1 wherein the divalent organic group X in the polymers represented by the general formulas (1) to (5) contains a divalent organic group having the fluorene skeleton represented by the structural formula (A) and divalent organic groups derived from other diamines at a mol ratio of 99/1 to 10/99.

4. Separation membranes according to claim 1 wherein said mixture of polymers consists of a mixture of at least two different types of polymers having the fluorene skeleton represented by the structural formula (A) and selected from the group consisting of polyesters, polyethers, polycarbonates, polyamides, and polyimides represented by the general formulas (1) to (5) and other polymers soluble in amide-based solvents at a mix ratio by weight of the former fluorene skeleton-containing polymers of the general formulas (1) to (5) to the latter amide-based solvent-soluble polymers in the range from 99/1 to 50/50.

5. Separation membranes according to claim 1, comprising a mixture of a polyester of formula (1) and a polyether of formula (2).

6. Separation membranes according to claim 1, comprising a mixture of a polyamide of formula (4) and a polyimide of formula (5).

7. Separation membranes according to claim 1, comprising a mixture of a polycarbonate of formula (3) and a polyamide of formula 4.

8. Separation membranes according to claim 1, comprising a mixture of a polyimide of formula (5) and a polyether of formula (2).

9. Ultrafiltration membranes characterized by the use of separation membranes comprising a mixture of polymers containing at least two different types of polymers selected from the group consisting of polyesters, polyethers, polycarbonates, polyamides, and polyimides respectively represented by the following general formulas (1) to (5)

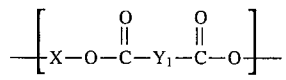 (1)

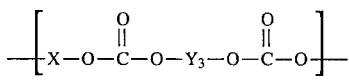 (2)

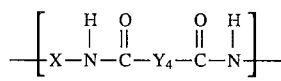 (3)

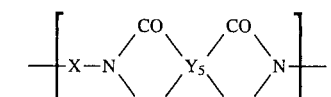 (4)

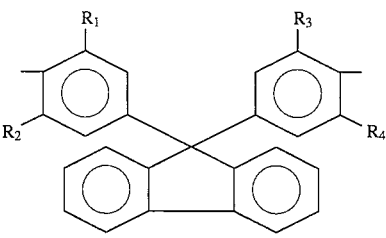 (5)

wherein $Y_1$, $Y_2$, $Y_3$ and $Y_4$ designated divalent organic groups, $Y_5$ designates a tetravalent organic group, and X is a divalent organic group containing at least partly a group represented by the following structural formula (A):

(A)

wherein $R_1$ to $R_4$ designate any one of H, alkyl groups with 1 to 4 carbon atoms, alkoxy groups, and halogens, and possessing a substantially spongy structure throughout.

10. Gas separation membranes characterized by the use of separation membranes comprising a mixture of polymers containing at least two different types of polymers selected from the group consisting of polyesters, polyethers, polycarbonates, polyamides, and polyimides respectively represented by the following general formulas (1) to (5)

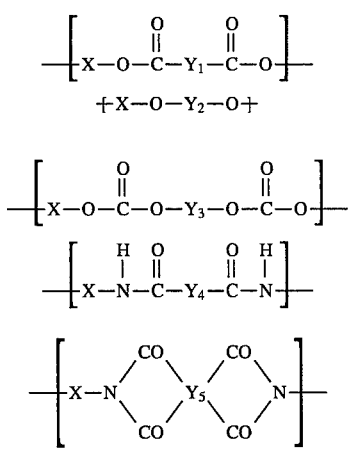

(1)

(2)

(3)

(4)

(5)

wherein $Y_1$, $Y_2$, $Y_3$ and $Y_4$ designate divalent organic groups, $Y_5$ designates a tetravalent organic group, and X is a divalent organic group containing at least partly a group represented by the following structural formula (A):

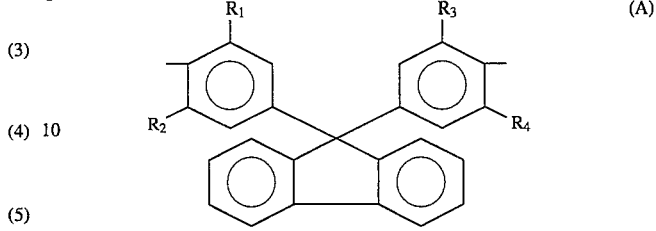

wherein $R_1$ to $R_4$ designate any one of H, alkyl groups with 1 to 4 carbon atoms, alkoxy groups, and halogens, and possessing a substantially spongy structure throughout.

\* \* \* \* \*